United States Patent [19]
DiChiara, Jr. et al.

[11] Patent Number: 5,980,980
[45] Date of Patent: Nov. 9, 1999

[54] METHOD OF REPAIRING POROUS CERAMIC BODIES AND CERAMIC COMPOSITION FOR SAME

[75] Inventors: Robert A. DiChiara, Jr.; Robert A. Jurf, both of San Diego, Calif.

[73] Assignee: McDonnell Douglas Corporation, St. Louis, Mich.

[21] Appl. No.: 08/959,771

[22] Filed: Oct. 29, 1997

[51] Int. Cl.$^6$ .............................. B32B 35/00; C09D 1/00
[52] U.S. Cl. ................. 427/140; 106/286.6; 106/287.17; 106/287.18; 106/287.29; 106/443; 106/419; 106/450; 106/457; 106/482; 427/287
[58] Field of Search ..................................... 427/140, 287; 106/457, 450, 419, 469, 287.29, 287.18, 287.17, 286.8, 286.6, 482, 443

[56] References Cited

U.S. PATENT DOCUMENTS

| | | | |
|---|---|---|---|
| 3,734,767 | 5/1973 | Church et al. | 427/226 |
| 3,925,575 | 12/1975 | Church et al. | 427/226 |
| 3,985,916 | 10/1976 | Church et al. | 427/226 |
| 5,129,905 | 7/1992 | Constante | 606/76 |

OTHER PUBLICATIONS

*Hollow Glass Microsphere Composites: Preparation and Properties,* H. Verweij et al., Journal of Materials Science (20), 1985, pp. 1069–1078, (No mo.).

*Primary Examiner*—Janyce Bell
*Attorney, Agent, or Firm*—Alston & Bird LLP

[57] ABSTRACT

A ceramic composition for the repair of porous ceramic bodies comprises a ceramic material having cations which are reactive with phosphate ions, a source of reactive phosphate ions, and filler. An aqueous slurry of the ceramic composition is prepared and applied to the damaged region of a porous ceramic body. The slurry mixture is dried within the damaged region of the porous ceramic body and heated to bind the mixture together and to bond the mixture to the porous ceramic body within the damaged region. The method of the invention allows for the in situ repair of ceramic materials without removing them from their supporting structure and can be used in the repair of ceramic tiles for spacecraft and aircraft.

23 Claims, 1 Drawing Sheet

METHOD OF REPAIRING POROUS CERAMIC BODIES AND CERAMIC COMPOSITION FOR SAME

CROSS REFERENCE TO THE RELATED APPLICATIONS

This application is related to commonly owned copending provisional application Ser. No. 60/029,657, filed Oct. 29, 1996, and claims the benefit of the earlier filing date of this application under 35 U.S.C. § 119(e).

FIELD OF THE INVENTION

This invention relates to porous ceramic bodies, and, more particularly, to the use of ceramic compositions in the repair of damaged ceramic bodies.

BACKGROUND OF THE INVENTION

Ceramic bodies in the form of tiles are widely used to insulate underlying structures against the high temperatures encountered in certain aerodynamic applications. As an example, an aerodynamic vehicle such as a space shuttle or a supersonic aircraft is heated by friction to a high temperature as it flies through the air. The temperature may be greater than the maximum permissible temperature of the basic metallic airframe structure. A ceramic tile attached to the exterior of the airframe structure insulates the airframe against the aerodynamic heating and also protects it against impact.

One known type of ceramic insulation is a porous ceramic made by pressing together fibers of one or more ceramic materials. This fibrous, porous ceramic is resistant to damage from thermal shock and thermal cycling. However, it is relatively soft and can be damaged by external impact and wear forces. To lessen such damage, it is known to apply protective coatings to the exterior surface of the ceramic insulation, such as those discussed in U.S. Pat. No. 5,079,082.

The protective coatings are quite effective in reducing the incidence of damage to the ceramic tiles from small objects such as dust particles and raindrops. However, even the best protective coatings cannot prevent damage to the tiles from relatively large objects such as rocks, hailstones, and the like. The impact of such large objects can dislodge pieces of the tiles leaving gouges and pits in the tiles, or even holes entirely through the tiles. Any significant damage of this type which reduces the thickness of ceramic protection overlying the metallic airframe and alters the airflow past the tile, can lead to hot spots in the airframe and failures of the entire damaged tiles.

The conventional method of repairing these ceramic tiles has been to remove and replace the damaged tiles. While effectively practiced at a central maintenance base, this approach is inconvenient for field service at a remote location where tiles of different types are not stored and maintained. Therefore, there is a need for an improved approach for replacing damaged porous ceramic tiles and restoring vehicles to operating conditions. The present invention fulfills this need and further provides related advantages.

SUMMARY OF THE INVENTION

The present invention provides a method of repairing damaged porous ceramic bodies such as ceramic insulating tiles using a ceramic composition. The ceramic composition can be easily applied to the damaged region and heated to moderate temperatures during the repair procedure. The ceramic composition sets to a cementitious form that is stable at very high temperatures and can be prepared to have mechanical properties which closely match the properties of the porous ceramic body being repaired. The method of the invention can be used to repair both small and large areas where a piece of the ceramic has been removed as by the impact of a large object. The repair procedure is readily performed both at central facilities and at field locations using commonly available supplies. The porous ceramic can, in most instances, be repaired without removing it from the larger supporting structure.

In accordance with the invention, a method for repairing a damaged porous ceramic body includes preparing an aqueous slurry mixture comprising a ceramic material having cations which are reactive with phosphate ions, a source of reactive phosphate ions, and filler. The slurry is applied to the damaged region of the ceramic body and dried in place within the damaged region to leave the mixture within the damaged region. The mixture is then heated to bind the mixture together and to bond the mixture to the ceramic body within the damaged region. The repair procedure can be used to repair porous ceramic bodies such as ceramic tiles which are initially formed by pressing and firing a mass of ceramic fibers.

The present invention also includes a ceramic composition for the repair of porous ceramic bodies comprising a ceramic material having cations which are reactive with phosphate ions, a source of reactive phosphate ions, and filler. The ceramic material preferably includes cations such as beryllium, aluminum, iron, magnesium, calcium, thorium, barium, zirconium, zinc, and silicon cations, and mixtures thereof. The ceramic material and source of phosphate ions are preferably provided in a prereacted form, e.g., as monoaluminum phosphate. The filler can be of any of a wide range of materials such as fibers, particles, solid microspheres, or hollow microspheres. The type of the filler can be selected to achieve particular properties of the mixture, such as density, hardness, or optical properties.

The present invention provides a significant advance in the use of porous ceramic materials. Specifically, damaged ceramic articles can be repaired without removing them from their supporting structure using the methods and materials of the invention. Other features and advantages of the present invention will be apparent from the following more detailed description of the preferred embodiment, taken in conjunction with the accompanying drawings, which illustrate, by way of example, the principles of the invention.

DETAILED DESCRIPTIONS OF THE PREFERRED EMBODIMENTS

The present invention will be described more fully hereinafter with reference to the accompanying drawings, in which preferred embodiments of the invention are shown. This invention can, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
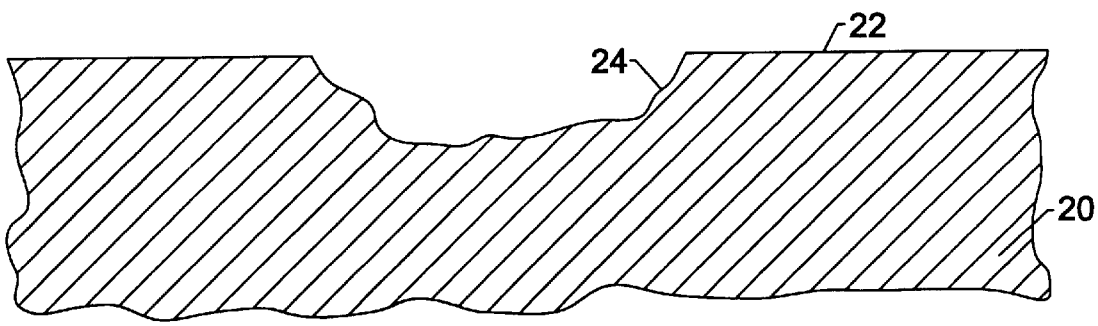
FIG. 1 is a schematic side sectional view of a porous ceramic body that has been damaged.

FIG. 1 depicts a porous ceramic body 20 having a surface 22. As illustrated in FIG. 1, the surface 22 has been damaged such as by the impact of a relatively large object and a portion of the ceramic body lost along the surface. The result of the impact is a damaged region 24 that can be repaired in accordance with the present invention.

Figure 2:
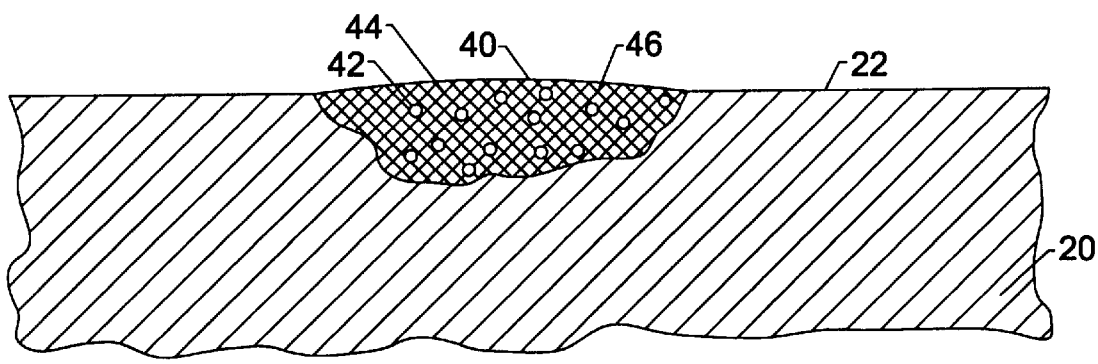
FIG. 2 is a schematic side sectional view of the porous ceramic body of FIG. 1 after repair in accordance with the present invention.

FIG. 2 illustrates the damaged ceramic body 20 of FIG. 1 repaired according to the invention. In the repair procedure of the invention, a damaged porous ceramic body 20 such as in FIG. 1 is provided. The ceramic body 20 can be made of any material and is preferably made by forming a mat of ceramic fibers and sintering the mat to form a porous structure. In one known approach, silica fibers, aluminoborosilicate fibers, and alumina fibers are placed into the mold. Various types of particles and a binder can also be used. The porous ceramic is formed using a vacuum which is drawn on one side of the mold to collapse the fibers into a mat with other additives captured inside the mat. The mat is then heated to a temperature of about 2500° F. to sinter the fibers into a solid ceramic body 22 having pores located therein. The nature of the porosity can be controlled by the manufacturing technique. FIG. 1 schematically depicts a generally equiaxed porosity but the porous ceramic can be constructed using other geometries as well. Other compositions of the ceramic body and other approaches for preparing the ceramic body can also be used. The porous ceramic body can be of the type used, for example, as protective tiles for high speed vehicles.

An aqueous slurry is prepared for use in the repair of the damaged ceramic body 20. The slurry comprises a ceramic material having cations which are reactive with phosphate ions, a source of reactive phosphate ions, and filler. The ceramic material is preferably a ceramic oxide comprising cations which are reactive with phosphate ions. Optimum bonding with the phosphate ions is produced using weakly basic or amphoteric cations having moderately small ionic radius. Oxides of cations from the group consisting of beryllium, aluminum, iron, magnesium, calcium, thorium, barium, zirconium, zinc, and silicon, are particularly preferred for use in the invention. Such oxides also include complex oxides such as magnesium-aluminum-silicon oxides. In addition, mixtures of the ceramic materials are also operable, particularly to achieve desirable combinations of properties in the final phosphate structure. The ceramic material is preferably an alumina powder, a silica powder, or a ceramic cordierite powder having the composition $MgAlSiO_3$.

The second component of the slurry mixture is a source of reactive phosphate ions. The reactive phosphate ions react with the ceramic material discussed above to produce ceramic phosphates. The reactive source of phosphate ions is preferably concentrated phosphoric acid.

Preferably, for use in the present invention, the ceramic material and the source of reactive phosphate ions are provided in a prereacted form. For example, monoaluminum phosphate is particularly preferred for use in the invention and is a prereacted form of alumina and phosphoric acid. Monoaluminum phosphate is available commercially as a mixture containing monoaluminum phosphate, $Al(H_2PO_4)_3$, and related species such as $AlH_3(PO_4)_2 \cdot H_2O$ and $Al_2(HPO_4)_3$. Other prereacted ceramic forms that react to produce phosphate-bonded phases can also be used such as magnesium phosphate $(Mg_3(PO_4)_2)$ derived from phosphoric acid and magnesium oxide. The prereacted ceramic material and source or reactive phosphate ions can also be combined with a ceramic powder of the ceramic material described above to aid in binding the ceramic composition after it is cured.

The third component of the mixture is a filler. The filler is a material used to modify and adjust the properties of the mixture as desired to yield specific properties in the patch material. Suitable fillers, can include, for example, fibers, particles, spheres, solid microspheres, or hollow microspheres. The type and relative amount of each of the fillers is selected to produce particular properties, such as density, hardness, thermal expansion properties, and surface finish. For example, hollow microspheres such as silica or quartz microspheres can be used to reduce the density and the thermal conductivity of the repaired region without sacrificing the good bonding of the repair material to the underlying porous ceramic.

In addition to the above components, water can be added to the slurry mixture to alter the viscosity of the mixture. Furthermore, the slurry mixture can also include other materials such as emittance reduction agents.

The ceramic material and filler of the invention are selected to match the properties of the porous ceramic material which is being repaired. Accordingly, the coefficient of thermal expansion of the ceramic material and filler preferably approximates the coefficient of thermal expansion of the porous ceramic body. Furthermore, the ceramic material and filler is selected to be materials which readily bond to the porous ceramic body being repaired.

The slurry mixture once prepared is applied to the damaged region 24 of the porous ceramic body 20. The slurry mixture can be applied using any operable tool such as a spatula, a trowel, a sprayer, or even by hand. The slurry mixture is worked into place in the damaged region 24 and given a smooth surface finish.

The water in the aqueous slurry mixture is removed by drying the slurry mixture leaving a solids mixture in the damaged region 24. Preferably as much water as possible is removed during drying to prevent further damage to the ceramic body 20 as the water later escapes at moderate or high temperatures. The slurry mixture is preferably dried at a temperature of from about 200° F. to about 300° F. In one preferred approach, the ceramic body and applied slurry mixture is heated to a temperature of 200° F. for two hours and then to 300° F. for 2 hours, to remove the water. Nevertheless, shorter drying times can also be used to provide the desired drying of the slurry mixture.

The dried mixture is heated to a temperature of at least about 500° F. to cause the ceramic material and the phosphate ions to react to form a phosphate-bonded structure. The heating temperature is preferably from about 650° F. to about 1000° F. A most preferred heating to achieve the reaction is to 750° F. for about two hours. The high temperatures cause the ceramic material and the phosphate ions to react to bind the ceramic mixture together within the damaged region. In addition, the phosphate ions typically react with ceramic filler used in the invention to better bind the ceramic mixture within the damaged region. The high temperatures also cause the ceramic composition to become bonded to the porous ceramic body. Specifically, the cured ceramic composition bonds to the porous ceramic body within the pores of the body and the phosphate ions can even react with the ceramic body thereby increasing the adhesion between the ceramic body and the applied ceramic mixture. Once reacted or cured, the cementitious reaction product is stable without decomposition or substantial softening at temperatures of at least about 2000° F. In addition, the phosphate-bonded ceramic material is hard and erosion resistant.

The drying and heating steps can be conducted by heating the entire ceramic body to the desired temperatures. For example, the drying and heating steps can be conducting by placing the entire ceramic body and repair mixture into an oven. Alternatively, the required temperatures can be achieved using a surface heating source such as a quartz heat lamp directed against the surface into which the slurry was introduced. In the latter approach, only the surface regions are heated, and in particular it is necessary only to heat the ceramic body 22 to the firing temperature in the damaged region 24. This heating approach makes it possible to repair damage to ceramic bodies in situ without removing them from the structure to which they are attached. For example, ceramic tiles can be repaired while still attached to the airframe structure.

FIG. 2 shows a repaired ceramic body 20. The repaired region 40 in FIG. 2 includes microspheres 42 and fibers 44 within a phosphate-bonded matrix 46. The phosphate-bonded structure 46 is bound together into a coherent mass and is also bonded to the underlying ceramic body 20 due to penetration of the slurry into the pores of the ceramic body and reaction between the phosphate ions and the ceramic body.

The present invention will now be further described by the following non-limiting examples.

EXAMPLE 1

A ceramic composition for repairing ceramic tiles comprising sintered silica fibers, aluminoborosilicate fibers, and alumina fibers was prepared. The ceramic composition included 43.2 parts by weight of cordierite powder having an average particle size of 2 microns (available from Baikowski International Corporation, Charlotte, N.C.), 27.6 parts by weight of 85 percent concentration phosphoric acid, 9.0 parts by weight of ECCO SI hollow silica spheres having an average particle size of 55 microns (available from Emerson and Cumings), 0.5 parts by weight of silicon carbide fibers, and 19.7 parts by weight of deionized water.

EXAMPLE 2

A ceramic composition for repairing ceramic tiles comprising sintered silica fibers, aluminoborosilicate fibers, and alumina fibers was prepared. The ceramic composition included 51.8 parts by weight of monoaluminum phosphate, 19.3 parts by weight of ECCO SI hollow silica spheres having an average particle size of 55 microns (available from Emerson and Cumings), 19.3 parts by weight of deionized water, and 9.6 parts by weight alumina powder having an average particle size of 0.5 microns (available as SM-8 from Baikowski International Corporation, Charlotte, N.C.).

EXAMPLE 3

A ceramic composition for repairing ceramic tiles comprising sintered silica fibers, aluminoborosilicate fibers, and alumina fibers was prepared. The ceramic composition included 58.5 parts by weight of monoaluminum phosphate, 21.8 parts by weight of ECCO SI hollow silica spheres having an average particle size of 55 microns (available from Emerson and Cumings), and 19.7 parts by weight of deionized water.

The present invention provides a method of repairing damaged porous ceramic bodies such as ceramic insulating tiles using a ceramic composition. The ceramic composition can be easily applied to divots or irregularities in porous ceramic bodies and used to repair these damaged areas. The ceramic composition can be easily squeegeed and sanded to provide the desired surface on the porous ceramic body. Furthermore, the ceramic composition has a low dielectric constant as is desired in certain aircraft and spacecraft.

While particular embodiments of the invention have been described, it will be understood, of course, the invention is not limited thereto since modifications may be made by those skilled in the art, particularly in light of the foregoing teachings. Therefore, the appended claims are contemplated to cover any such modifications that incorporate the features of these improvements in the true spirit and scope of the invention.

That which is claimed:

1. A method of repairing a damaged porous ceramic body comprising the steps of:

preparing an aqueous slurry comprising a mixture of a ceramic material having cations which are reactive with phosphate ions, a source of reactive phosphate ions, and filler;

applying the slurry mixture to a damaged region of a porous ceramic body;

drying the slurry mixture within the damaged region of the porous ceramic body; and heating the mixture to bind the mixture together and to bond the mixture to the porous ceramic body within the damaged region.

2. The method according to claim 1 wherein said step of preparing an aqueous slurry comprises providing a ceramic material having cations selected from the group consisting of beryllium, aluminum, iron, magnesium, calcium, thorium, barium, zirconium, zinc, and silicon cations, and mixtures thereof, as the ceramic material in the mixture.

3. The method according to claim 1 wherein said step of preparing an aqueous slurry comprises providing a ceramic oxide including cations selected from the group consisting of beryllium, aluminum, iron, magnesium, calcium, thorium, barium, zirconium, zinc, and silicon cations, and mixtures thereof, as the ceramic material in the mixture.

4. The method according to claim 1 further comprising the step of prereacting the ceramic material and the source of phosphate ions prior to said preparing step.

5. The method according to claim 1 wherein said step of preparing an aqueous slurry comprises providing monoaluminum phosphate as the ceramic material and the source of reactive phosphate ions.

6. The method according to claim 1 wherein said applying step comprises applying the slurry mixture to a ceramic body comprising ceramic fibers selected from the group consisting of silica fibers, aluminoborosilicate fibers, and alumina fibers.

7. The method according to claim 6 wherein said preparing step comprises providing ceramic fibers selected from the group consisting of silica fibers, aluminoborosilicate fibers, and alumina fibers, as fillers for the mixture.

8. The method according to claim 1 wherein said method of repairing a damaged porous ceramic body comprises the in situ repair of ceramic tiles and said heating step comprises heating the slurry mixture using heat lamps directed against the damaged area.

9. The method according to claim 1 wherein said drying and heating steps comprise drying and heating the damaged porous structure and the slurry mixture in an oven.

10. The method according to claim 1 wherein the ceramic material and filler is selected such that the coefficient of thermal expansion of the ceramic material and filler approximates the coefficient of thermal expansion of the porous ceramic body.

11. The method according to claim 1 wherein said heating step comprises heating the slurry mixture to a temperature of above about 500° F.

12. The method according to claim 1 wherein said heating step comprises heating the slurry mixture to a temperature of between about 650° F. and 1000° F.

13. The method according to claim 1 wherein said drying step comprises drying the slurry mixture at a temperature of between about 200° F. and about 300° F.

14. The method according to claim 1 wherein said step of preparing an aqueous slurry comprises providing the ceramic material and the source of reactive phosphate ions in prereacted form for use in the mixture.

15. A ceramic composition for the repair of porous ceramic bodies comprising:

cordierite or alumina powder;

a ceramic material comprising cations which are reactive with phosphate ions;

a source of reactive phosphate ions; and filler.

16. The ceramic composition according to claim 15 wherein the cations of said ceramic material are selected from the group consisting of beryllium, aluminum, iron, magnesium, calcium, thorium, barium, zirconium, zinc, and silicon cations, and mixtures thereof.

17. The ceramic composition according to claim 15 wherein said ceramic material includes oxides comprising cations selected from the group consisting of beryllium, aluminum, iron, magnesium, calcium, thorium, barium, zirconium, zinc, and silicon cations, and mixtures thereof.

18. The ceramic composition according to claim 15 wherein said ceramic material and said source of reactive phosphate ions are provided in a prereacted form.

19. The ceramic composition according to claim 15 wherein said ceramic material and said source of reactive phosphate ions comprises monoaluminum phosphate.

20. The ceramic composition according to claim 15 wherein said source of reactive phosphate ions comprises phosphoric acid and said ceramic material is cordierite or alumina.

21. The ceramic composition according to claim 15 wherein said filler includes ceramic fibers selected from the group consisting of silica fibers, aluminoborosilicate fibers, and alumina fibers.

22. The ceramic composition according to claim 15 wherein said filler includes solid or hollow ceramic microspheres.

23. A ceramic composition for the repair of porous ceramic bodies comprising:

monoaluminum phosphate;

cordierite or alumina powder; and solid or hollow ceramic microspheres.

* * * * *

UNITED STATES PATENT AND TRADEMARK OFFICE
CERTIFICATE OF CORRECTION

PATENT NO. : 5,980,980

DATED : November 9, 1999

INVENTOR(S) : DiChiara, Jr. et al.

It is certified that error appears in the above-identified patent and that said Letters Patent is hereby corrected as shown below:

Title page, [73] Assignee's address, "St. Louis, Mich." should read --St. Louis, Mo.--.

Title page, insert the following:
  --Related U.S. Application Data
    Provisional Application No. 60/029,657, Oct. 29, 1996--.

On the title page, item [56] Reference cited:
line 4, "Constante" should read --Constantz--.

Column 2, line 57, in the sub-heading, "DESCRIPTIONS" should read --DESCRIPTION--.

Column 6, line 54, "fillers" should read --filler--.

Signed and Sealed this

Twenty-ninth Day of August, 2000

Attest:

Attesting Officer

Q. TODD DICKINSON

*Director of Patents and Trademarks*